US008965949B2

(12) United States Patent
Thieret (10) Patent No.: US 8,965,949 B2
(45) Date of Patent: Feb. 24, 2015

(54) SYSTEM AND METHOD FOR APPLYING COMPUTATIONAL KNOWLEDGE TO DEVICE DATA

(75) Inventor: Tracy E. Thieret, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 1973 days.

(21) Appl. No.: 11/118,813

(22) Filed: Apr. 29, 2005

(65) Prior Publication Data

US 2006/0248178 A1     Nov. 2, 2006

(51) Int. Cl.

| | |
|---|---|
| *G06F 15/16* | (2006.01) |
| *G06F 7/38* | (2006.01) |
| *G06F 17/00* | (2006.01) |
| *G06F 17/20* | (2006.01) |
| *G06F 17/21* | (2006.01) |
| *G06F 17/22* | (2006.01) |
| *G06F 17/24* | (2006.01) |
| *G06F 17/25* | (2006.01) |
| *G06F 17/26* | (2006.01) |
| *G06F 17/27* | (2006.01) |
| *G06F 17/28* | (2006.01) |
| *G06N 5/02* | (2006.01) |
| *G09G 1/16* | (2006.01) |
| *G05B 23/02* | (2006.01) |
| *G06Q 30/02* | (2012.01) |

(52) U.S. Cl.
CPC ............... *G06N 5/025* (2013.01); *G09G 1/162* (2013.01); *G05B 23/0232* (2013.01); *G06Q 30/02* (2013.01); *G05B 2219/50065* (2013.01)
USPC ............................ 709/203; 708/290; 715/215

(58) Field of Classification Search
CPC .................. G05B 23/0232; G05B 2219/3215; G05B 2219/50065; G09G 1/162
See application file for complete search history.

(56) References Cited

U.S. PATENT DOCUMENTS

| | | | | |
|---|---|---|---|---|
| 5,551,030 | A | * | 8/1996 | Linden et al. .................. 707/102 |
| 5,555,346 | A | * | 9/1996 | Gross et al. ...................... 706/45 |
| 6,389,426 | B1 | * | 5/2002 | Turnbull et al. ............... 707/661 |
| 6,434,514 | B1 | * | 8/2002 | Chen et al. ..................... 702/188 |
| 6,564,227 | B2 | | 5/2003 | Sakakibara et al. |
| 6,577,323 | B1 | * | 6/2003 | Jamieson et al. .............. 715/700 |
| 6,763,482 | B2 | | 7/2004 | Bernklau-Halvor |

(Continued)

OTHER PUBLICATIONS

Matsuura, Satoshi et. al. "An Extension of ECA Architecture and Its Application to HTML Document Browsing," Oct. 1999, IEEE, pp. 738-743.*

*Primary Examiner* — Azizul Choudhury
(74) *Attorney, Agent, or Firm* — MH2 Technology Law Group LLP (57) ABSTRACT

A system and method are provided for acquiring and processing device usage data and applying a computational knowledge thereto for proactively determining customer state, including inferring device usage patterns, and accordingly proposing at least one action, if any, to be undertaken. In particular, computational knowledge represented by a set of rules is applied to the processed device data for analyzing the processed data and describing at least one feature or characteristic relating to the processed data using keywords. A rules database is accessed and at least one rule is selected from a set of rules. The at least one selected rule includes keywords which substantially match the keywords used to describe the feature or characteristic of the processed data. The at least one selected rule is then correlated to at least one proposed action using the rules database. The at least one determined rule and/or at least one proposed action are then outputted.

22 Claims, 7 Drawing Sheets

(56) References Cited

U.S. PATENT DOCUMENTS

| | | |
|---|---|---|
| 6,782,495 B2 | 8/2004 | Bernklau-Halvor |
| 6,826,579 B1 * | 11/2004 | Leymann et al. .............. 717/131 |
| 6,912,536 B1 * | 6/2005 | Ochitani ....................... 707/737 |
| 6,934,696 B1 * | 8/2005 | Williams et al. ................ 706/47 |
| 7,013,323 B1 * | 3/2006 | Thomas et al. ............... 709/203 |
| 7,043,400 B2 * | 5/2006 | Stobie et al. .................. 702/183 |
| 7,089,194 B1 * | 8/2006 | Berstis et al. .............. 705/14.54 |
| 7,469,238 B2 * | 12/2008 | Satchwell ....................... 706/45 |
| 2003/0110412 A1 | 6/2003 | Neville |
| 2003/0163380 A1 | 8/2003 | Vaccarelli et al. |
| 2003/0194689 A1 * | 10/2003 | Kamasaka et al. ............ 434/350 |
| 2005/0080755 A1 * | 4/2005 | Aoyama .......................... 707/1 |

\* cited by examiner

SYSTEM AND METHOD FOR APPLYING COMPUTATIONAL KNOWLEDGE TO DEVICE DATA

BACKGROUND

The present disclosure relates to remote data acquisition and processing, and in particular, to a system and method for remotely acquiring and processing device data. More particularly, the present disclosure relates to a system and method for remotely acquiring and processing device data and applying computational knowledge represented by a set of rules. The application of the computational knowledge to processed device data enables a proactive determination of customer and device state, including the ability to infer device usage patterns, and accordingly propose at least one action.

It is desirable for a company which sells and/or leases computing devices and equipment, such as xerographic and electronic printing systems, to be able to proactively determine its customers' state (positive or negative) with respect to the devices and take action, if necessary. One conventional proactive method entails contacting the customers on a periodic or sporadic basis to determine their state and accordingly determine if any action is necessary. Other conventional methods can be described as being non-proactive, such as answering inquiries and telephone calls by customers made to a customer service help center and "listening" for any "human noise" in the field regarding the operation and performance of the computing devices and equipment.

Historically, with the latter two conventional methods, negative customer state or customer dissatisfaction with the computing devices is not realized by the company until after the customer has experienced some level of frustration with the computing device and equipment. By this time, the customer is apt to request a like-for-like trade or removal of the computing devices altogether.

Further, the conventional methods are most suited for determining or gauging negative customer states and not positive customer states. However, it is desirable for the company to also determine or gauge positive customer states regarding the computing devices and propagate or make known these positive customer states to other customers or potential customers in order to increase usage of the computing devices sold or leased to other customers (e.g., increase the number of pages copied a week by a copier) or sell/lease the same or similar computing devices to the potential customers.

Accordingly, it is an aspect of the present disclosure for a system and method for remotely acquiring and processing device data and applying computational knowledge thereto for proactively determining customer state, including inferring device usage patterns, and determining if any actions are to be taken.

SUMMARY

According to the present disclosure, a system and method are provided for acquiring and processing device data and applying computational knowledge thereto for proactively determining customer state, including inferring device usage patterns, and accordingly proposing at least one action, if any, to be undertaken.

In particular, the system and method, in accordance with the present disclosure, remotely acquire via a network device data, such as operational- and performance-related data, corresponding to one or more customers' computing devices and equipment, and process the device data. The system and method then apply computational knowledge to the processed device data. Computational knowledge may be in any of several forms and represented by a set of rules. Examples include but are not limited to backward and forward chaining rules, fuzzy rules, neural nets, model based expert systems, or any conventional program that emulates a skilled human analyzer of the data. For illustrative purposes herein, a forward chaining rules paradigm is used in describing the system and method of the present disclosure.

The system and method entail analyzing the processed device data and identifying at least one feature of the processed device data; accessing a rules database storing the set of rules, each rule of the selected rules being correlated to at least one proposed action; selecting at least one rule from the set of rules which includes data matching the at least one identified feature; determining at least one proposed action correlated to the at least one selected rule; and outputting the at least one proposed action relating to the device.

More particularly, the system and method in accordance with the present disclosure receives the data from the device, applies any required pre-processing to the device data, and then applies the rules to the device data. During the preprocessing, among other tasks, the data from the device is combined with previously received data for that device. One or more graphs (such as one- and multi-dimensional graphs) are then generated which describe and illustrate various features found in the data. The graphs as well as summary descriptions of the graphs using quantitative or qualitative approaches are added to the data to be analyzed by the rules.

In addition, there may be additional information systems that contain related information about the customer or his devices. This information may include the purchase date of the device, time and contents of conversations with sales or service personnel regarding the device, and/or any other information relevant to the device. This information is provided to the system of the present disclosure.

At least one processor of the system analyzes the processed device data, the derived graphical and summary information, and the additional customer information, and derives at least one feature or characteristic relating to the collected data. The graphical representations are useful for viewing as verification of the rule-based decisions.

The at least one processor accesses a rules database of the system which stores a set of rules each describing a different feature or characteristic which can possibly describe various data and corresponding likely scenarios (device overused, device underused, possible breakdown of the device, etc.) relating to the described feature or characteristic. Each rule of the set of rules further includes information inferring or speculating a device pattern which tends to explain the behavior of the feature. The rules database of the system further correlates each rule of the set of rules to at least one proposed action.

After accessing the rules database, the at least one processor selects at least one rule which identifies a feature or characteristic which substantially approximates or matches the at least one feature or characteristic related to the processed device data. Alternatively, the at least one rule can be determined by the system storing a plurality of graphical representations in a memory and using comparison algorithms to select one of the plurality of representations having a feature which substantially matches or approximates the feature of the processed and graphically represented device data. At least one rule is then selected or determined which is correlated to the selected graphical representation. At a minimum, the rules should be able to validate that no extraordinary positive or negative trends or states are contained in the data.

In accordance with the rules-based approach of the present disclosure, the at least one processor then correlates that at least one selected rule to at least one proposed action, since the rules database correlates each rule to at least one proposed action. The at least one determined rule and/or at least one proposed action are presented to the operator of the system via the display for viewing the at least one determined rule and at least one proposed action. The operator can then make inquiries by contacting the customer to determine whether to undertake the at least one proposed action.

The at least one proposed action may include remediation of a possible negative customer state by checking to see if the customer's device has had a breakdown; propagation of a positive customer state to other customers and potential customers by informing these individuals of the throughput capacity of the customer's device; provide advice and suggestions to the customer regarding the computing device to increase the customer state; etc. Hence, in accordance with the present disclosure, the system and method proactively determine on a continuous or periodic basis the customer state, including inferring device usage patterns, and propose at least one action, if any, to be undertaken.

BRIEF DESCRIPTION OF THE DRAWINGS

Various embodiments of the present disclosure will be described herein below with reference to the figures wherein.

DETAILED DESCRIPTION OF THE PREFERRED EMBODIMENTS

The present disclosure provides a system and method for acquiring and processing device data and applying computational knowledge thereto for proactively determining customer state, including inferring device usage patterns, and accordingly proposing at least one action, if any, to be undertaken.

Figure 1:
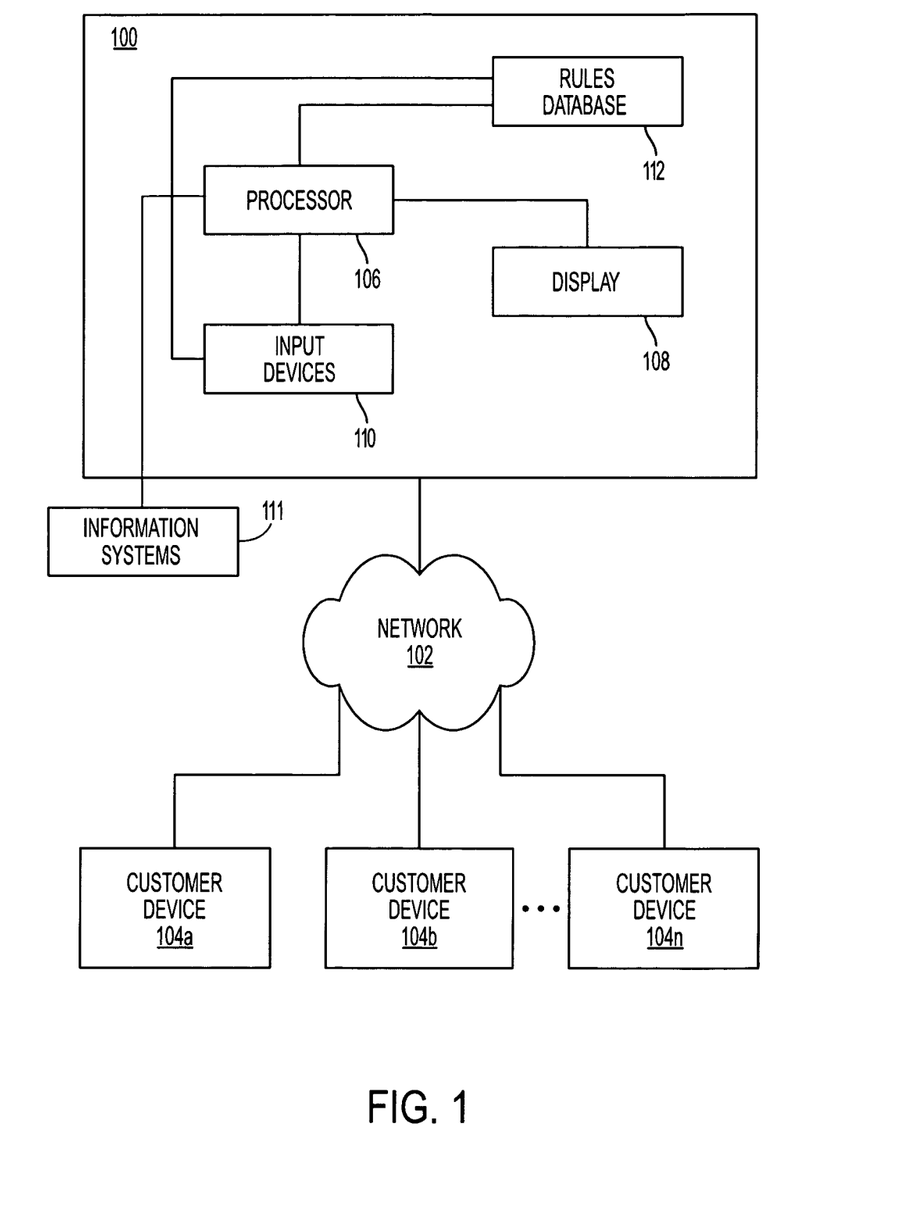
FIG. 1 is a block diagram of a system for remotely acquiring and processing device data and applying a set of rules thereto for proactively determining customer state in accordance with the present disclosure.
Figure 2:
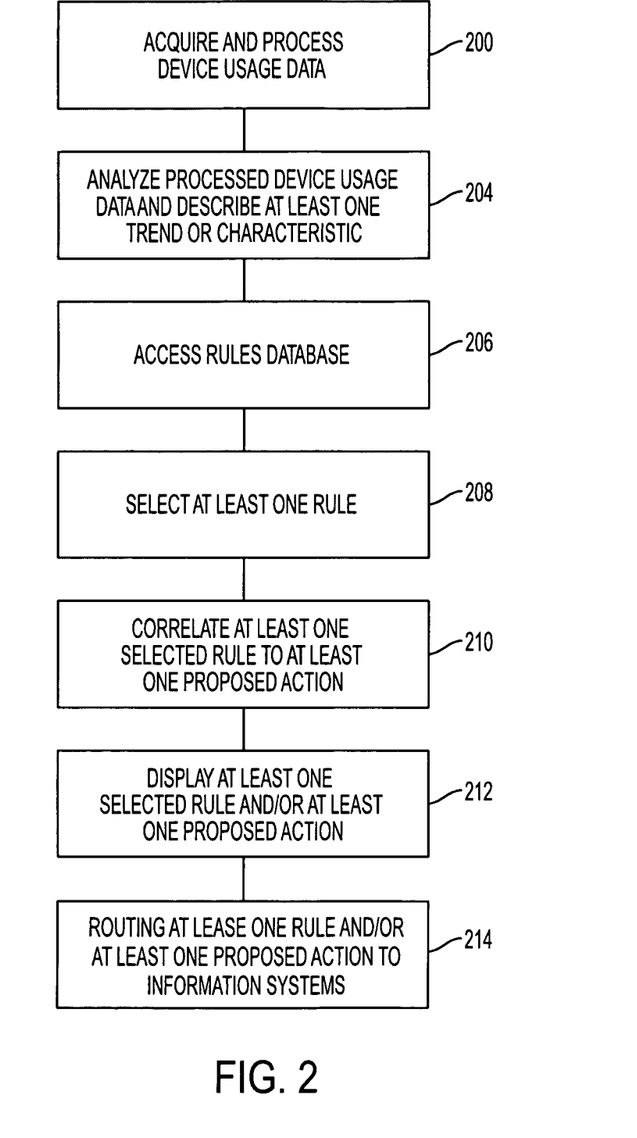
FIG. 2 is a flow chart illustrating the steps of the method for proactively determining customer state in accordance with the present disclosure.

With reference to FIGS. 1 and 2, there are shown a block diagram of the system and a flow chart of the method in accordance with the present disclosure. The system is designated generally by reference numeral 100 in FIG. 1. The system 100 and method remotely acquire via a network 102, such as the Internet, LAN, Ethernet, etc., device data, such as operational- and performance-related data, corresponding to one or more customers' computing devices and equipment 104a-104n, such as xerographic and electronic printing systems, and process the device data (step 200 in FIG. 2).

The system 100 includes at least one processor 106 programmed by a set of programmable instructions for performing the functions and operations described herein in accordance with the methodology of the present disclosure. The set of programmable instructions can be stored within a computer-readable medium, such as a CD-ROM, for being downloaded to the at least one processor 106 for storage within a memory of the at least one processor 106.

The set of programmable instructions are configured for being fetched from the memory and being executed by the at least one processor 106 for remotely acquiring via the network 102 the device data and processing the device data. The processed device data may be graphically presented to an operator of the system via a display 108 either continuously, on a periodic basis, and/or upon receiving an operator request via one or more input devices 110. The input devices 110 preferably include a keyboard, a mouse and optical media reading/writing devices.

The system 100 and method in accordance with the present disclosure apply computational knowledge to the processed device data. Computational knowledge can also be applied by the at least one processor 106 to derived graphical data, qualitative and quantitative descriptors of the graphs, as well as customer data (customer identity, customer history, customer's business, etc.) and device data (installation date, model number, year manufactured, etc.) acquired from information systems 111 (see FIG. 1). Computational knowledge may be in any of several forms and represented by a set of rules. Examples include but are not limited to backward and forward chaining rules, fuzzy rules, neural nets, model based expert systems, or any conventional program that emulates a skilled human analyzer of the data.

For illustrative purposes herein, a forward chaining rule paradigm is used by the system of the present disclosure. The standard definition of a forward-chaining system is that the system operates by repeating the following sequence of operations: 1. Examine the rules to find a rule one whose "If part" is satisfied by the current contents of a working memory. 2. Fire the rule by adding to the working memory the facts that are specified in the rule's "Then part."

In particular, in accordance with an exemplary system of the present disclosure, a rules-based approach is applied to the processed device data (step 202 in FIG. 2). The rules-based approach entails for the at least one processor 106 to analyze the processed data and describe at least one feature or characteristic relating to the processed and graphically represented device data (step 204 in FIG. 2). To this end, the at least one processor 106 is programmed to use keywords (i.e., select keywords from a set of keywords) describing the feature of the processed and graphically represented device data. The keywords used to describe that feature or characteristic of the processed and graphically represented device data can include keywords such as "intermittent upward jumps," "intermittent downward jumps," "flat and intermittent upward jumps," "flat and intermittent downward jumps," "abruptly breaks upward," "abruptly breaks downward," etc.

The at least one processor 106 then accesses a rules database 112 of the system 100 which stores a set of rules describing different features or characteristics which can possibly describe various processed device data and corresponding likely scenarios (device overused, device underused, possible breakdown of the device, etc.) relating to the described feature or characteristic (step 206 in FIG. 2). The set of rules further includes information inferring or speculating a device usage pattern which tends to explain the behavior of the feature.

For example, one rule of the set of rules stored by the rules database 112 is "The trend line for throughput breaks upward; this indicates that the customer has improved the throughput of jobs by the computing device dramatically," while another rule is "The trend line for throughput breaks downward; this indicates that the customer has reduced the throughput of jobs by the computing device dramatically." The rules database 112 of the system 100 further correlates each rule of the set of rules to at least one proposed action as further described below.

The rules are preferably formulated by inspection and from conversations with sales representatives, technical representatives, analysts, etc., but may also be formulated from data mining analysis coupled with previously obtained and stored data. The methodology of the present disclosure further includes for rules and their corresponding proposed actions, if any, to be formulated on an ongoing basis and for the rules database to be continuously or periodically appended with the newly formulated rules and their corresponding actions, if any. It is contemplated that the rules may be removed as vendor policies change and in addition the rules may be specific for a specific customer or class of customers. Customer data can be obtained from the information systems 111 mentioned above.

After accessing the rules database 112, the at least one processor 106 selects at least one rule (step 208 in FIG. 2). Step 208 entails for the at least one processor 106 to determine at least one rule stored by the rules database 112 which identifies a feature or characteristic which substantially approximates or matches the at least one feature or characteristic related to the processed device data as described in step 204. This is accomplished by using comparison or word matching algorithms as known in the art to determine the feature or characteristic stored by the rules database 112 which substantially approximates or matches the keywords used in step 204 to describe the at least one feature or characteristic related to the processed device data. The at least one rule which includes identical or similar keywords as the keywords used to describe the at least one feature or characteristic related to the processed device data is then selected by the at least one processor 106.

Alternatively, the at least one rule can be determined by the system 100 storing a plurality of graphical representations in a memory and using comparison algorithms to select one of the plurality of graphical representations having a feature which substantially matches or approximates the feature of the processed and graphically represented device data. At least one rule is then selected which is stored in the rules database 112 which correlates to the selected graphical representation.

In accordance with the rules-based approach of the present disclosure, the at least one processor 106 then correlates that at least one selected rule to at least one proposed action, since, as mentioned above, the rules database 112 correlates each rule to at least one proposed action (step 210 in FIG. 2). The at least one determined rule and/or at least one proposed action are outputted or presented to the operator of the system 100, preferably, via the display 108 for viewing the at least one determined rule and at least one proposed action (step 212 in FIG. 2). The operator can then make inquiries by contacting the customer to determine whether to undertake the at least one proposed action. The at least one proposed action can also be routed to the information systems 111 (step 214 in FIG. 2).

The at least one proposed action may include remediation of a possible negative customer state by checking to see if the customer's computing device has had a breakdown; propagation of a positive customer state to other customers and potential customers by informing these individuals of the throughput capacity of the customer's computing device; provide advice and suggestions to the customer regarding the computing device to increase the customer state; etc.

The at least one proposed action can be routed to the information systems 111. These systems 111 can be operated or overseen by various organizations with some relationship to the customer through sales, service, marketing, or services provided by the organizations. These organizations can determine their own response to the proposed action, e.g., high or low priority, ignore, immediate action required, etc.

The operator may further use the input devices 110 to reprogram the at least one processor 106, append the rules database 112 with additional information and to edit information stored therein, interact with the display 108, etc.

The system 100 of the present disclosure is designed to be able to explain when questioned about its conclusions. To this end, the system 100 is programmed for outputting an explanation with respect to its determination of the proposed action, after receiving an inquiry by a user for such an explanation. The production of graphs and explanatory text by the system 100 serves as an inspect-able artifact that can be used as backup for providing the explanation.

With reference to FIGS. 3-7, there are shown exemplary graphical representations of processed device data in accordance with the present disclosure. These graphical representations show examples of print count profiles (device data) over time (days) obtained by data pushes from a customer's xerographic machine (e.g., copier) via the network connection 102. Examination of these graphical representations indicates the nature of the rules that may be applied and what action the selection of the rule by the at least one processor 106 might prompt. Hence, in accordance with the present disclosure, the system and method proactively determine on a continuous or periodic basis the customer state, including inferring device usage patterns, and propose at least one action, if any, to be undertaken.

The benefits of providing a graphical representation illustrating frequent device data to the operator of the system 100 are readily apparent from FIGS. 3-7. One benefit provides for the operator's sales representative to consider and analyze the usage pattern regarding the customer's device prior to visiting the customer site. While visiting the customer site, the graphical representation can be used as a graphical aid for discussing the customer's usage of the device.

Figure 3:
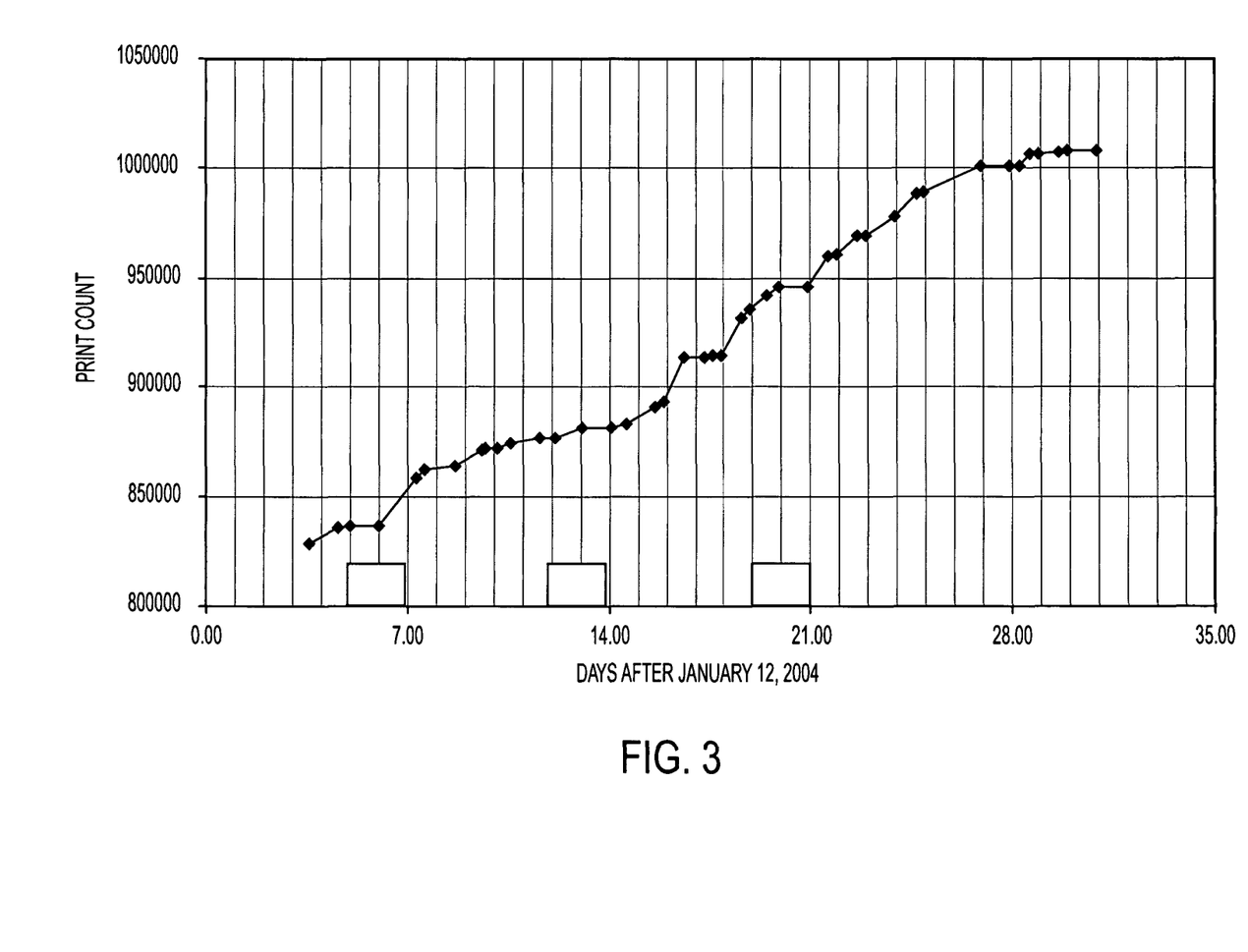
FIGS. 3-7 are exemplary visual graphical representations of processed device data in accordance with the present disclosure.

FIG. 3 illustrates a graphical representation of processed device data showing the trend line being roughly constant followed by a few days of near zero slope. By visually observing the graphical representation of the processed device data, one sees that the trend line increases more or less steadily with a few exceptions, but most notably at the end of the time period plotted when the trend line levels off. It is further observed that there have been short periods of non-activity which are not associated with weekends (represented by the white boxes along the abscissa). These periods of non-activity are probably service calls or other idle periods. These idle periods should be investigated but overall print count growth has been nice and steady through the month. Print count increases steadily by 50,000 prints or copies per week for an estimated total of 200,000 copies per month.

Performing an analysis of the graphical representation using the system and method of the present disclosure, the at least one processor 106 is programmed to describe the trend line shown by FIG. 3 by the keywords "constant" and "zero slope" (step 204). The at least one processor 106 then accesses the rules database 112 (step 206) and performs step 208 to select at least one rule stored in the rules database 112 which includes these keywords. The rule which is selected from the rules database 112 with respect to the graphical representation shown by FIG. 3 states "The trend line is roughly constant but is followed by a few (parameterized) days of near zero slope." This selected rule is then correlated by the at least one processor 106 to at least one proposed action (step 210) which states "Examine the cause of the reduction in page volume and remediate." The at least one selected rule and/or at least one proposed action are then displayed to the operator of the system 100 via the display 108.

Figure 4:
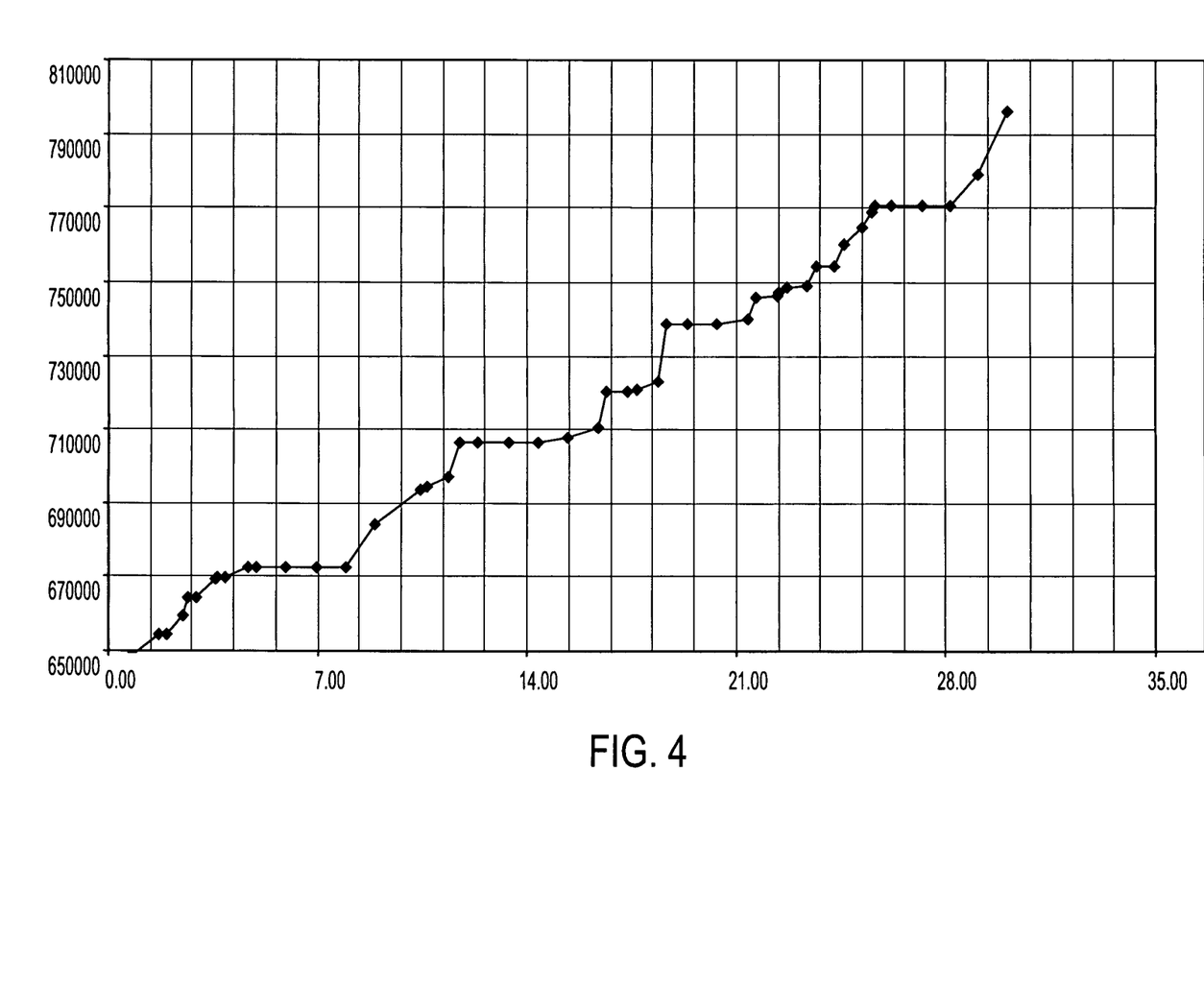

FIG. 4 illustrates a graphical representation of processed device data showing the trend line being mostly flat with sporadic jumps. By visually observing the graphical representation of the processed device data, one sees that the trend line is flat during the weekends indicating that the customer site is probably closed over the weekends. It is further observed that the customer runs long jobs at regular intervals with some printing in between. Based on the visual observation, one should check to see if the long jobs are scheduled to run at times known in advance. If so, schedule service visits to precede the long run jobs.

Performing an analysis of the graphical representation using the system and method of the present disclosure, the at least one processor 106 is programmed to describe the trend line shown by FIG. 4 by the keywords "flat" and "sporadic jumps" (step 204). The at least one processor 106 then accesses the rules database 112 (step 206) and performs step 208 to select at least one rule stored in the rules database 112 which includes these keywords. The rule which is selected from the rules database 112 with respect to the graphical representation shown by FIG. 4 states "The trend line is mostly flat with sporadic jumps; this customer may be running infrequent long jobs between periods of inactivity." This selected rule is then correlated by the at least one processor 106 to at least one proposed action (step 210) which states "Determine if the customer is running infrequent long jobs between periods of inactivity and, if so, encourage the customer to migrate other printing activities to this device to utilize the lower per page costs associated with this device. Schedule a service call to precede the spurts of activity." The at least one selected rule and/or at least one proposed action are then displayed to the operator of the system 100 via the display 108.

Figure 5:
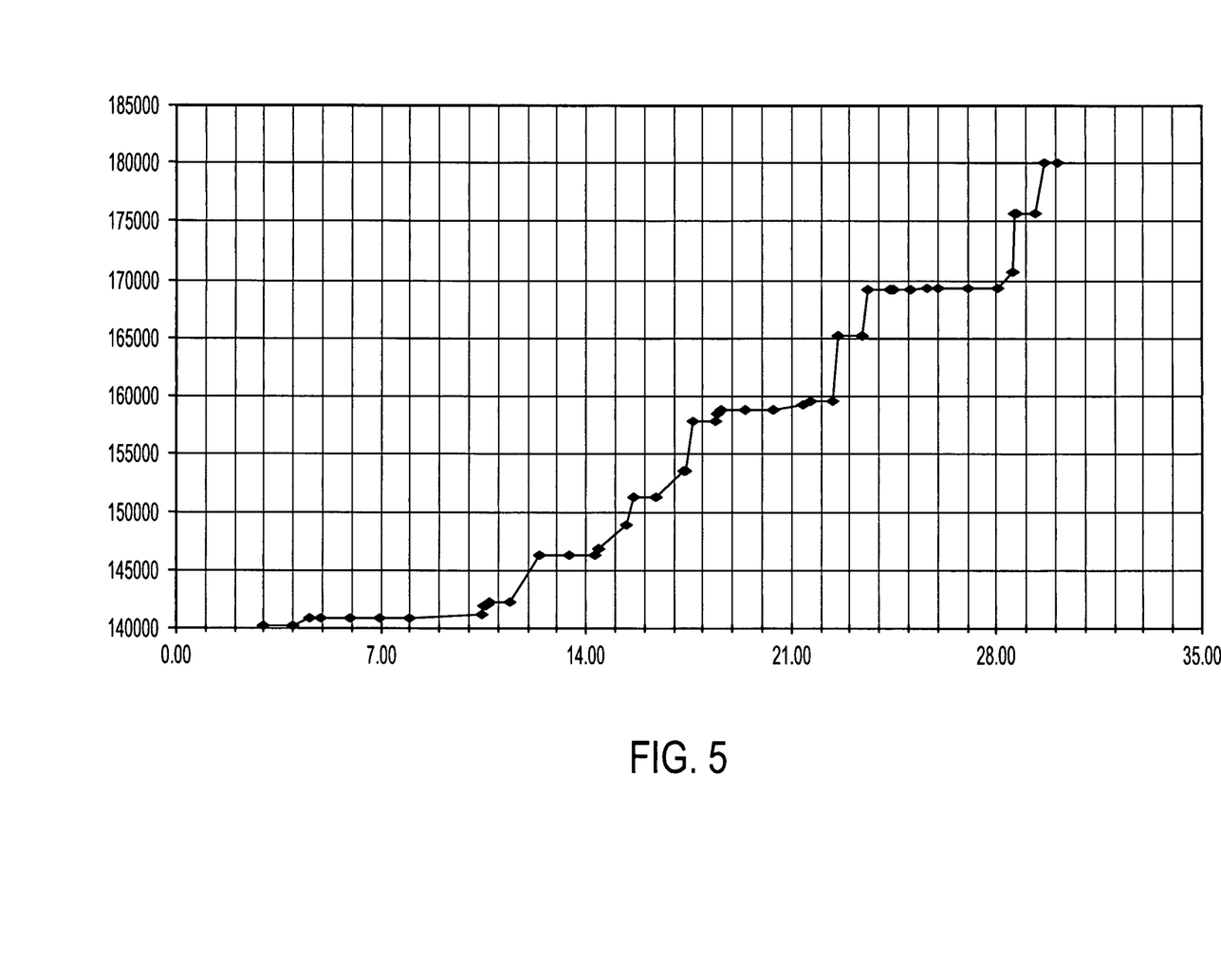

FIG. 5 illustrates a graphical representation of processed device data showing the trend line being mostly flat with sporadic jumps. By visually observing the graphical representation of the processed device data, one sees that there are relatively long idle periods followed by one day spurt of activity. These spurts are about 5,000 copies in magnitude and appear to come at sporadic intervals. Similar to the observations made with respect to the graphical representation illustrated by FIG. 4, one should determine whether the long jobs are pre-planned or scheduled ad hoc. One should further determine if the customer can migrate some of its other printing jobs to this device when the device is idle. Further, determine if the customer may require a device having a higher productivity and speed than the device the customer is currently using to turn the sporadic jobs over quickly.

Performing an analysis of the graphical representation using the system and method of the present disclosure, the at least one processor 106 is programmed to describe the trend line shown by FIG. 5 by the keywords "flat" and "sporadic jumps" (step 204). The at least one processor 106 then accesses the rules database 112 (step 206) and performs step 208 to select at least one rule stored in the rules database 112 which includes these keywords. The rule which is selected from the rules database 112 with respect to the graphical representation shown by FIG. 5 states "The trend line is mostly flat with sporadic jumps; this customer may be running infrequent long jobs between periods of inactivity." This is the same rule selected for the graphical representation shown by FIG. 4. The selected rule is then correlated by the at least one processor 106 to at least one proposed action (step 210) which states "Determine if the customer is running infrequent long jobs between periods of inactivity and, if so, encourage the customer to migrate other printing activities to this device to utilize the lower per page costs associated with this device. Schedule a service call to precede the spurts of activity." The at least one selected rule and/or at least one proposed action are then displayed to the operator of the system 100 via the display 108.

Figure 6:
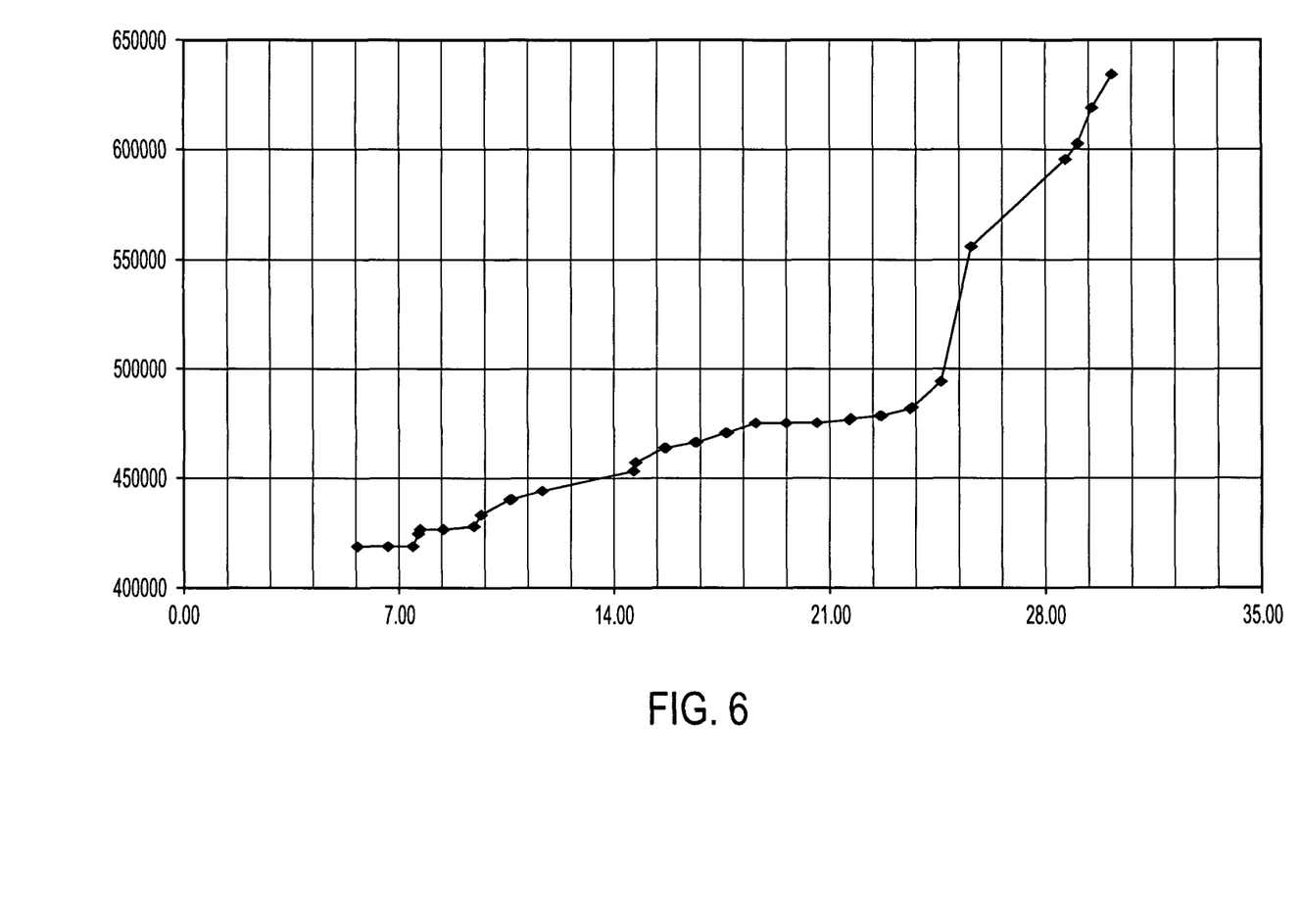

FIG. 6 illustrates a graphical representation of processed device data showing the trend line abruptly breaking upward. By visually observing the graphical representation of the processed device data, one sees that there is a steady ramping up and then a dramatic increase in slope which probably indicates the customer got more business. Check to see why the big increase in the number of pages copied. Determine if the customer needs a higher-volume device.

Performing an analysis of the graphical representation using the system and method of the present disclosure, the at least one processor 106 is programmed to describe the trend line shown by FIG. 6 by the keywords "abruptly breaks upward" (step 204). The at least one processor 106 then accesses the rules database 112 (step 206) and performs step 208 to select at least one rule stored in the rules database 112 which includes these keywords. The rule which is selected from the rules database 112 with respect to the graphical representation shown by FIG. 6 states "The trend line abruptly breaks upward; this customer may have improved its throughput of jobs dramatically." This selected rule is then correlated by the at least one processor 106 to at least one proposed action (step 210) which states "Determine if the customer requires a higher-volume device and, if so, recommend another device." The at least one selected rule and/or at least one proposed action are then displayed to the operator of the system 100 via the display 108.

Figure 7:
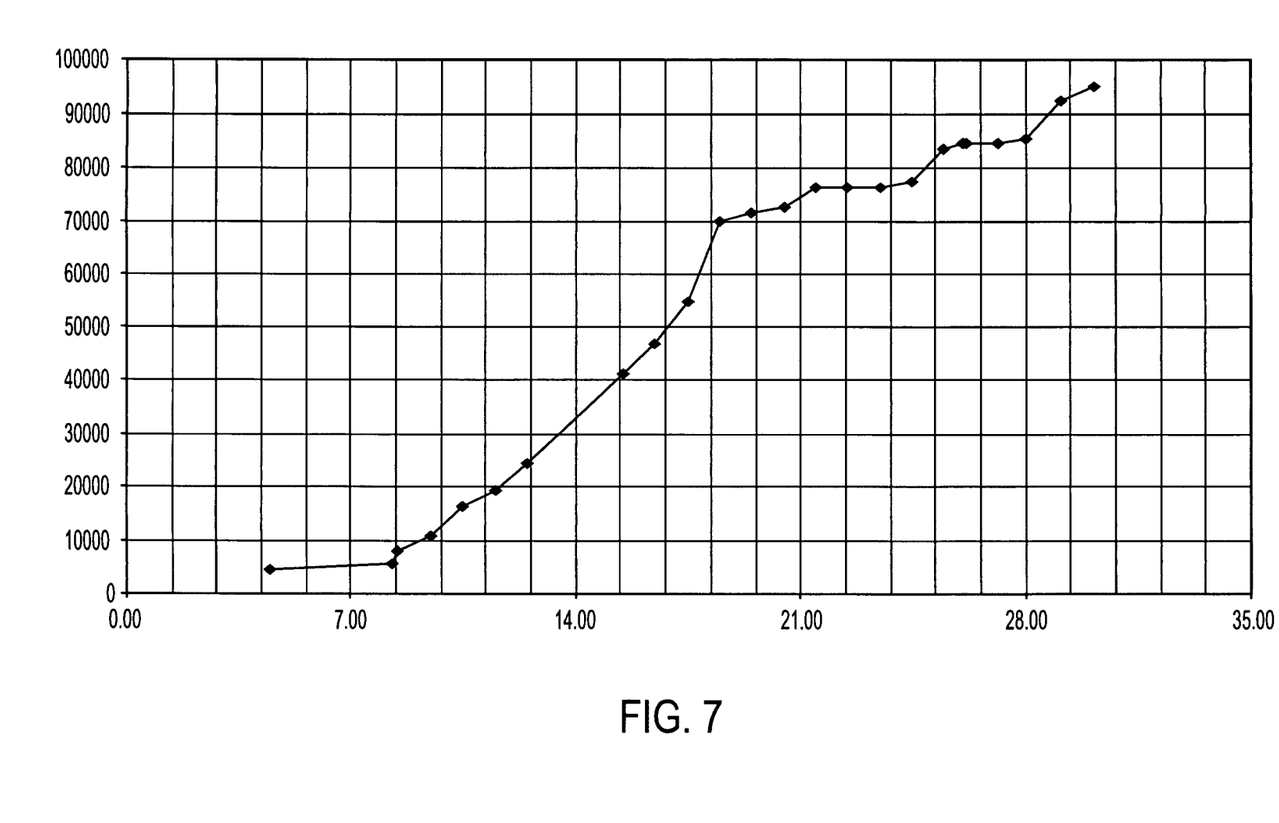

FIG. 7 illustrates a graphical representation of processed device data showing the trend line abruptly breaking downward. By visually observing the graphical representation of the processed device data, one sees that there is a steady ramping up and then a dramatic decrease in slope which probably indicates the customer lost business or the device is malfunctioning. Check to see why the big decrease in the number of pages copied. Determine if the customer needs a new device or the current device requires service.

Performing an analysis of the graphical representation using the system and method of the present disclosure, the at least one processor 106 is programmed to describe the trend line shown by FIG. 7 by the keywords "abruptly breaks downward" (step 204). The at least one processor 106 then accesses the rules database 112 (step 206) and performs step 208 to select at least one rule stored in the rules database 112 which includes these keywords. The rule which is selected from the rules database 112 with respect to the graphical representation shown by FIG. 6 states "The trend line abruptly breaks downward; this customer may have reduced its throughput of jobs dramatically." This selected rule is then correlated by the at least one processor 106 to at least one proposed action (step 210) which states "Determine if the customer has had a decrease in business or the device has had a breakdown and requires service." The at least one selected rule and/or at least one proposed action are then outputted to the operator of the system 100, preferably, via the display 108 (step 212). The at least one selected rule and/or at least one proposed action can also be routed to information systems 111 (step 214).

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method for applying a set of rules to a processed device data corresponding to a device, said method comprising:
    identifying, in the processed device data, a trend line comprising a graphical representation of the processed device data, the processed device data including operational and performance related data of the device, and the trend line indicating a state of the device;
    analyzing the trend line to select at least one selected keyword from a predetermined plurality of keywords that describes at least one feature of the trend line;
    accessing a rules database storing said set of rules, wherein each rule of the set of rules comprises descriptive textual data that describes at least one trend line feature and a reason for the at least one trend line feature;
    examining the set of rules to determine at least one rule from the set of rules containing descriptive textual data that includes the at least one selected keyword;
    identifying a proposed action correlated to the at least one rule, wherein the proposed action is for remedying the state of the device indicated by the trend line; and
    providing the proposed action to a user associated with the device for determining whether to undertake the proposed action.

2. The method according to claim 1, wherein the at least one keyword further describes a feature of the processed device data.

3. The method according to claim 1, wherein examining the set of rules comprises selecting the at least one rule from the set of rules which includes at least one alternate keyword which approximates the at least one keyword.

4. The method according to claim 1, further comprising providing an explanation of the proposed action to the user.

5. The method according to claim 1, wherein examining the set of rules comprises selecting the at least one rule from the set of rules which is correlated to a graphical feature which approximates the graphical representation of the processed device data.

6. The method according to claim 1, wherein providing the proposed action to the user comprises displaying the at least one rule and the proposed action.

7. The method according to claim 1, further comprising:
    receiving an indication of new rules; and
    appending the new rules to the rules database.

8. The method according to claim 1, further comprising:
    determining that the trend line is mostly flat with sporadic jumps; and
    determining, based on the trend line that was determined, a usage pattern of the device that indicates that the device is running infrequently and long jobs between periods of inactivity.

9. The method according to claim 1, further comprising:
    determining that the trend line abruptly breaks upward; and
    determining, based on the trend line that was determined, a usage pattern of the device that indicates that a throughput of the device has improved.

10. The method according to claim 1, further comprising:
    determining that the trend line steadily ramps up and then dramatically decreases in slope; and
    determining, based on the trend line that was determined, a usage pattern of the device that indicates that the device is malfunctioning.

11. The method according to claim 1, further comprising:
    determining that the trend line abruptly breaks downward; and
    determining, based on the trend line that was determined, a usage pattern of the device that indicates that the throughput of the device has been reduced.

12. A system for applying a set of rules to a processed device data corresponding to a device, said system comprises:
    a memory storing a set of instructions and the set of rules; and
    a processor executing the set of instructions, the instructions to:
        identify, in the processed device data, a trend line comprising a graphical representation of the processed device data, the processed device data including operational and performance related data of the device, and the trend line indicating a state of the device;
        analyze the trend line to select at least one selected keyword from a predetermined plurality of keywords that describes at least one feature of the trend line;
        access a rules database storing said set of rules, wherein each rule of the set of rules comprises descriptive textual data that describes at least one trend line feature and a reason for the at least one trend line feature
        examine the set of rules to determine at least one rule from the set of rules containing descriptive textual data that includes the at least one selected keyword;
        identify a proposed action correlated to the at least one rule, wherein the proposed action is for remedying the state of the device indicated by the trend line; and
        provide the proposed action to a user associated with the device for determining whether to undertake the proposed action.

13. The system according to claim 12, wherein the at least one keyword further describes a feature of the processed device data.

14. The system according to claim 12, wherein examining the set of rules comprises selecting the at least one rule from the set of rules which includes at least one alternate keyword which approximates the at least one keyword.

15. The system according to claim 12, the instructions further to represent the processed device data by a graphical representation having a feature.

16. The system according to claim 15, wherein examining the set of rules comprises selecting the at least one rule from the set of rules which is correlated to a graphical feature which approximates the feature of the graphical representation of the processed device data.

17. The system according to claim 12, wherein providing the proposed action to the user comprises displaying the at least one rule and the proposed action.

18. A computer-readable medium storing a set of programmable instructions configured for being executed by at least one processor for applying a set of rules to a processed device data corresponding to a device for performing a method comprising the steps of:
    identifying, in the processed device data, a trend line comprising a graphical representation of the processed device data, the processed device data including operational and performance related data of the device, and the trend line indicating a state of the device;
    analyzing the trend line to select at least one selected keyword from a predetermined plurality of keywords that describes at least one feature of the trend line;
    accessing a rules database storing said set of rules, wherein each rule of the set of rules comprises descriptive textual data that describes at least one trend line feature and a reason for the at least one trend line feature;

examining the set of rules to determine at least one rule from the set of rules containing descriptive textual data that includes the at least one selected keyword;

identifying a proposed action correlated to the at least one rule, wherein the proposed action is for remedying the state of the device indicated by the trend line; and providing the proposed action to a user associated with the device for determining whether to undertake the proposed action.

19. The computer-readable medium according to claim 18, wherein the at least one keyword further describes a feature of the processed device data.

20. The computer-readable medium according to claim 18, wherein examining the set of rules comprises selecting the at least one rule from the set of rules which includes at least one alternate keyword which approximates the at least one keyword.

21. The computer-readable medium according to claim 18, the method further comprising providing an explanation of the proposed action to the user.

22. The computer-readable medium according to claim 18, wherein examining the set of rules comprises selecting the at least one rule from the set of rules which is correlated to a graphical feature which approximates the graphical representation of the processed device data.

* * * * *